US007787893B2

United States Patent
Jeong et al.

(10) Patent No.: US 7,787,893 B2
(45) Date of Patent: Aug. 31, 2010

(54) HARD HANDOVER METHOD AND APPARATUS FOR USER EQUIPMENT (UE) USING FREQUENCY LAYER CONVERGENCE (FLC) IN A MULTIMEDIA BROADCAST/MULTICAST SYSTEM (MBMS) SYSTEM

(75) Inventors: Kyeong-In Jeong, Suwon-si (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 982 days.

(21) Appl. No.: 11/224,018

(22) Filed: Sep. 13, 2005

(65) Prior Publication Data

US 2006/0058047 A1    Mar. 16, 2006

(30) Foreign Application Priority Data

Sep. 15, 2004    (KR) ...................... 10-2004-0073973

(51) Int. Cl.
*H04W 72/00* (2009.01)
*H04W 36/00* (2009.01)
*H04B 15/00* (2006.01)

(52) U.S. Cl. .......................... 455/464; 455/62; 455/436

(58) Field of Classification Search ................. 370/335, 370/338, 343, 432, 390, 329, 468, 312, 319, 370/328, 465, 331, 437; 455/464, 500, 509, 455/436–438, 443, 447–448, 517, 450, 62, 455/452.1
See application file for complete search history.

(56) References Cited

U.S. PATENT DOCUMENTS 7,336,659 B2 *    2/2008    Meago ........................ 370/390

(Continued)

FOREIGN PATENT DOCUMENTS

EP    1 372 350    12/2003

(Continued)

OTHER PUBLICATIONS

Universal Mobile Telecommunications System (UMTS); Introduction of Multimedia Broadcast/Multicast Service (MBMS) in the Radio Access Network (RAN); Stage 2 (3GPP TS 25.346 Version 6.2.0 Release 6); ETSI TS 125 346.

(Continued)

*Primary Examiner*—George Eng
*Assistant Examiner*—Brandon J Miller
(74) *Attorney, Agent, or Firm*—Roylance, Abrams, Berdo & Goodman, L.L.P.

(57) ABSTRACT

Disclosed a method for efficiently performing a frequency shift when a User Equipment (UE) intends to receive at least one service through at least one preferred frequency in a system for providing a Multimedia Broadcast/Multicast Service (MBMS) service. The method comprises the steps of inserting information for a preferred frequency of a service into a message and transmitting the message to the UE, the service being indicated by the message, the message reporting a start of the service which the UE has joined, receiving a response message including request information representing the indicated service or at least one different service, which has been selected by the UE, and determining if the UE is to perform hard handover to the preferred frequency according to the request information.

32 Claims, 9 Drawing Sheets

U.S. PATENT DOCUMENTS

| | | |
|---|---|---|
| 2003/0104801 A1 | 6/2003 | Koulakiotis et al. |
| 2004/0116139 A1* | 6/2004 | Yi et al. .................. 455/503 |
| 2004/0223513 A1* | 11/2004 | Meago .................... 370/468 |
| 2005/0054344 A1* | 3/2005 | Jung et al. ............... 455/432.3 |
| 2005/0070277 A1* | 3/2005 | Hu ........................ 455/432.3 |
| 2005/0083884 A1* | 4/2005 | Lee et al. ................. 370/331 |
| 2005/0090278 A1 | 4/2005 | Jeong et al. |
| 2005/0232292 A1* | 10/2005 | Richards et al. .......... 370/432 |
| 2006/0023664 A1* | 2/2006 | Jeong et al. ............. 370/329 |
| 2006/0072516 A1* | 4/2006 | Jeong et al. ............. 370/335 |
| 2006/0079239 A1* | 4/2006 | Kwak et al. ............. 455/447 |
| 2007/0053336 A1* | 3/2007 | Petrovic et al. .......... 370/343 |

FOREIGN PATENT DOCUMENTS

| | | |
|---|---|---|
| EP | 1 372 350 A1 | 12/2003 |
| EP | 1 509 056 A2 | 2/2005 |
| WO | WO 2004/071117 A1 | 8/2004 |

OTHER PUBLICATIONS

"Support of Multimedia Broadcast Multicast Service (MBMS) in GERAN" 3GPP TSG Geran Meeting #13, Jan. 21, 2003.

Anonymous, 3GPP TS25.346 V6.1.0, Jun. 2004, pp. 10, 11, 13-15, 21, 23, 25-29, 33-40 and 42-44.

Nokia, 3GPP TSG-RAN-WG2 Meeting #42, Tdoc R2-041355, Jun. 21, 2006.

Vodafone Group, FLC Stage 2 Issues, 3GPP R2-041614, Aug. 16, 2004.

Vodafone Group, Frequency Layer Convergence Clarifications, 3GPP R2-041067, May 10-14, 2004.

Anonymous, 3GPP TSG GERAN Meeting #3, TD 3GPP/GP#13(03)0273, Feb. 3, 2003.

\* cited by examiner

HARD HANDOVER METHOD AND APPARATUS FOR USER EQUIPMENT (UE) USING FREQUENCY LAYER CONVERGENCE (FLC) IN A MULTIMEDIA BROADCAST/MULTICAST SYSTEM (MBMS) SYSTEM

PRIORITY

This application claims the benefit under 35 U.S.C. 119(a) of an application entitled "Hard Handover Method and Apparatus for UE using FLC in MBMS System" filed in the Korean Intellectual Property Office on Sep. 15, 2004 and assigned Ser. No. 2004-73973, the entire contents of which are hereby incorporated by reference.

BACKGROUND OF THE INVENTION

1. Field of the Invention

The present invention relates to a Multimedia Broadcast/Multicast Service (MBMS) of a mobile communication system. More particularly, the present invention relates to a hard handover method and apparatus for a User Equipment (UE) using Frequency Layer Convergence (FLC) with a dedicated channel.

2. Description of the Related Art

Currently, mobile communication systems using a wideband Code Division Multiple Access (CDMA) scheme are being developed for packet service communication for the transmission of mass storage data and multimedia broadcast/communication for the transmission of multimedia services other than conventional voice communication. Accordingly, in order to support multimedia broadcast/multimedia communication (MBMS), an MBMS service capable of providing a service to a plurality of user equipments (UEs) from one or a plurality of multimedia data sources has been discussed.

The term "MBMS service" typically refers to a service for transmitting the same multimedia data to a plurality of receivers through a wireless network. Herein, the receivers share one radio channel, so that radio transmission resources can be efficiently used. This type of MBMS service is capable of supporting multimedia transmission of realtime images and voices, still images, texts, and so on, while simultaneously providing voice and image data according to the type of multimedia transmission. This requires a large amount of resources. In an MBMS service, because the same data must be transmitted to a plurality of cells including users, a Point-to-Point (PtP) connection or a Point-to-Multiple (PtM) connection is used according to the number of users included in each cell.

A conventional MBMS system supports FLC technology capable of allocating a preferred frequency to each available MBMS service and allowing UEs using the MBMS services to receive a desired MBMS service through the preferred frequency as much as possible. That is, a FLC of a MBMS corresponds to a method for moving a UE to a preferred frequency band according to each service in order to provide a service through only one frequency according to each available service, instead of providing one service through overlapping frequencies in the same service area.

Figure 1:
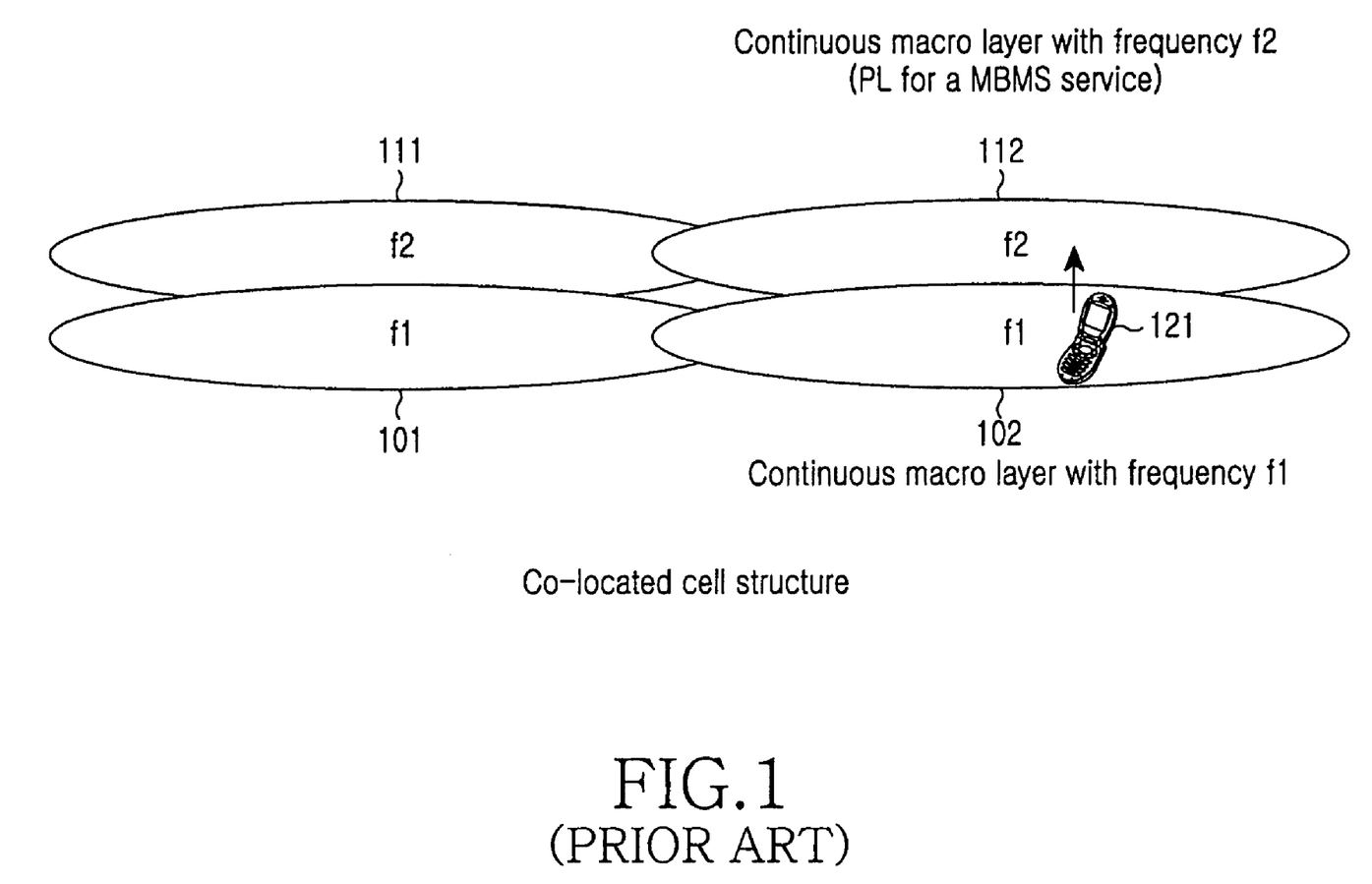
FIG. 1 is a diagram illustrating a conventional Multimedia Broadcast/Multicast Service (MBMS) Frequency Layer Convergence (FLC) operation.

FIG. 1 is a diagram illustrating a conventional MBMS FLC operation. FIG. 1 shows a cell structure in which cells using different frequencies f1 and f2 overlap geographically in a $3^{rd}$ Generation Project Partnership (3GPP) system which corresponds to a standard of a $3^{rd}$ generation asynchronous mobile communication network scheme based on a Global System for Mobile Communication network (GSM) and a General Packet Radio Services (GPRS). Further, one cell comprised of one frequency or a layer of continuous cells will be referred to as a layer.

In FIG. 1, reference numbers 101 and 102 represent layers comprised of the frequency f1, respectively, and reference numbers 111 and 112 represent layers comprised of the frequency f2, respectively. An FLC moves a UE to a corresponding frequency band according to each service in order to provide a service via one frequency according to each available service, instead of providing one service through all cells of the frequencies f1 and f2 that overlap in the same service area as illustrated in FIG. 1.

When a layer having a frequency f2 allocated for a MBMS service, which a UE 121 has joined, the UE 121 which currently uses the frequency f1 which overlaps in the same service or coverage area as frequency f2, the UE 121 must move to the cell having the frequency f2 in order to continue to receive the MBMS service when a session of the MBMS service starts and while the session is in progress. A Radio Network Controller (RNC) informs UEs using the frequency f1 that they must move to the cell of the frequency f2 when the session of the MBMS service starts and while the session is in progress.

In the MBMS service, the cell of the frequency f1 will be referred to as a Preferred Frequency Layer (PL) and the cell of the frequency f2 will be referred to as a Non-Preferred Frequency Layer (NPL). It should be noted that the term NPL does not always denote that the MBMS service is unavailable. That is, the MBMS service may be provided through the NPL for a UE remaining in the NPL by a Radio Resource Management (RRM) in spite of a FLC method.

Typically, the MBMS service has one layer, but may have different layers according to areas. For example, in one area, a layer of the frequency f2 may be a PL. However, in another area, a layer of the frequency f1 may be a PL. In the MBMS service, a PL is determined by a cell structure policy of a system operator and the radio resource availability of a currently used cell. However, a conventional FLC structure representing a frequency layer allocated to the MBMS service is applied until one session of the MBMS service starts and ends.

Figure 2:
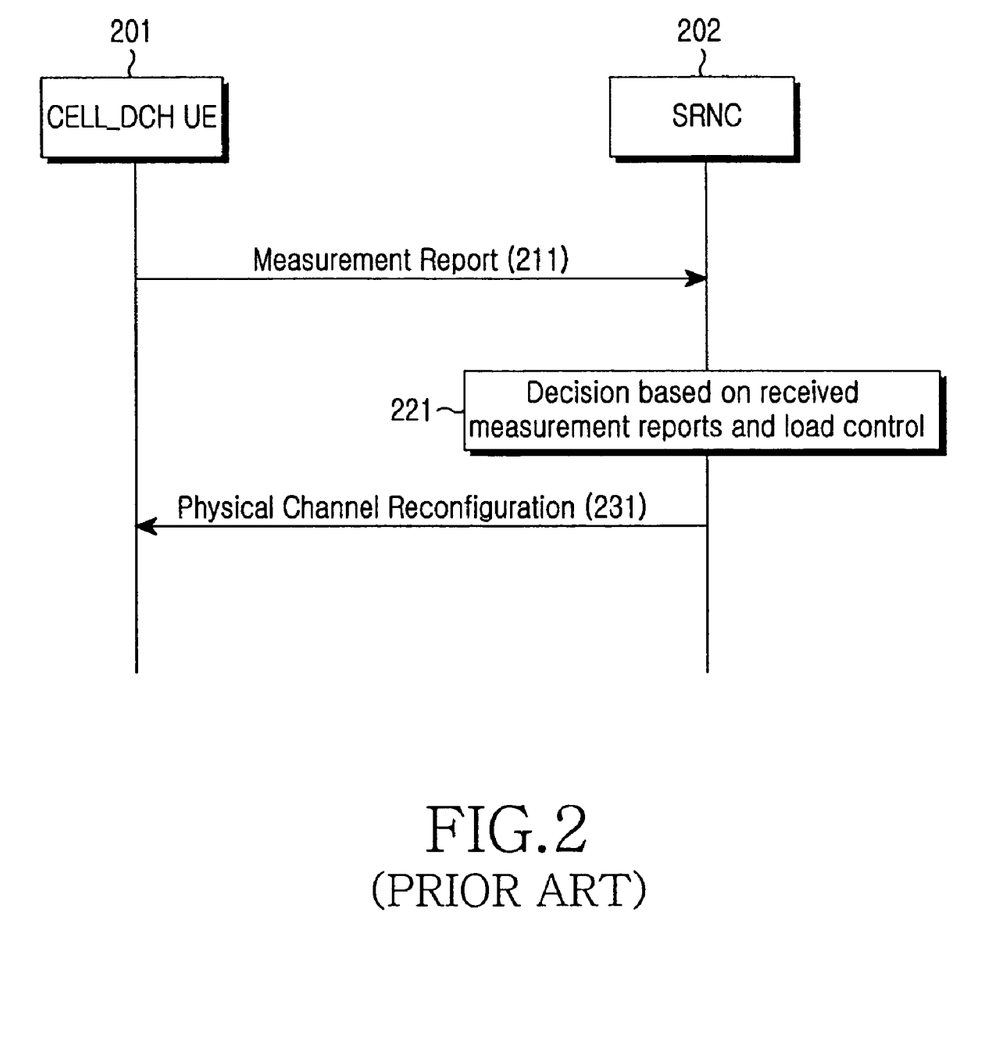
FIG. 2 is a flow diagram illustrating a conventional hard handover process of a user equipment (UE)

FIG. 2 is a flow diagram illustrating a conventional hard handover process of a UE. Specifically, FIG. 2 shows an operation of a CELL_DCH UE that receives a service through a Dedicated Channel (DCH). A reference number 201 represents the CELL_DCH UE and a reference number 202 represents a Serving RNC (SRNC) of the UE 201.

Referring to FIG. 2, in step 211, the UE 201 transmits measurement reports for a downlink to the SRNC 202 by means of an uplink message. The downlink measurement report includes inter-frequency measurement report values, and may be classified as a periodic report and an event-triggered report. In step 221, the SRNC 202 receives the measurement report and determines if the hard handover for the UE 201 must be performed based on the inter-frequency measurement reports and information on loads of cells. If the SRNC 202 selects a hard handover for the UE 201 in step 221, the SRNC 202 directs the UE 201 to perform the hard handover through a physical channel reconfiguration message in step 231.

Figure 3:
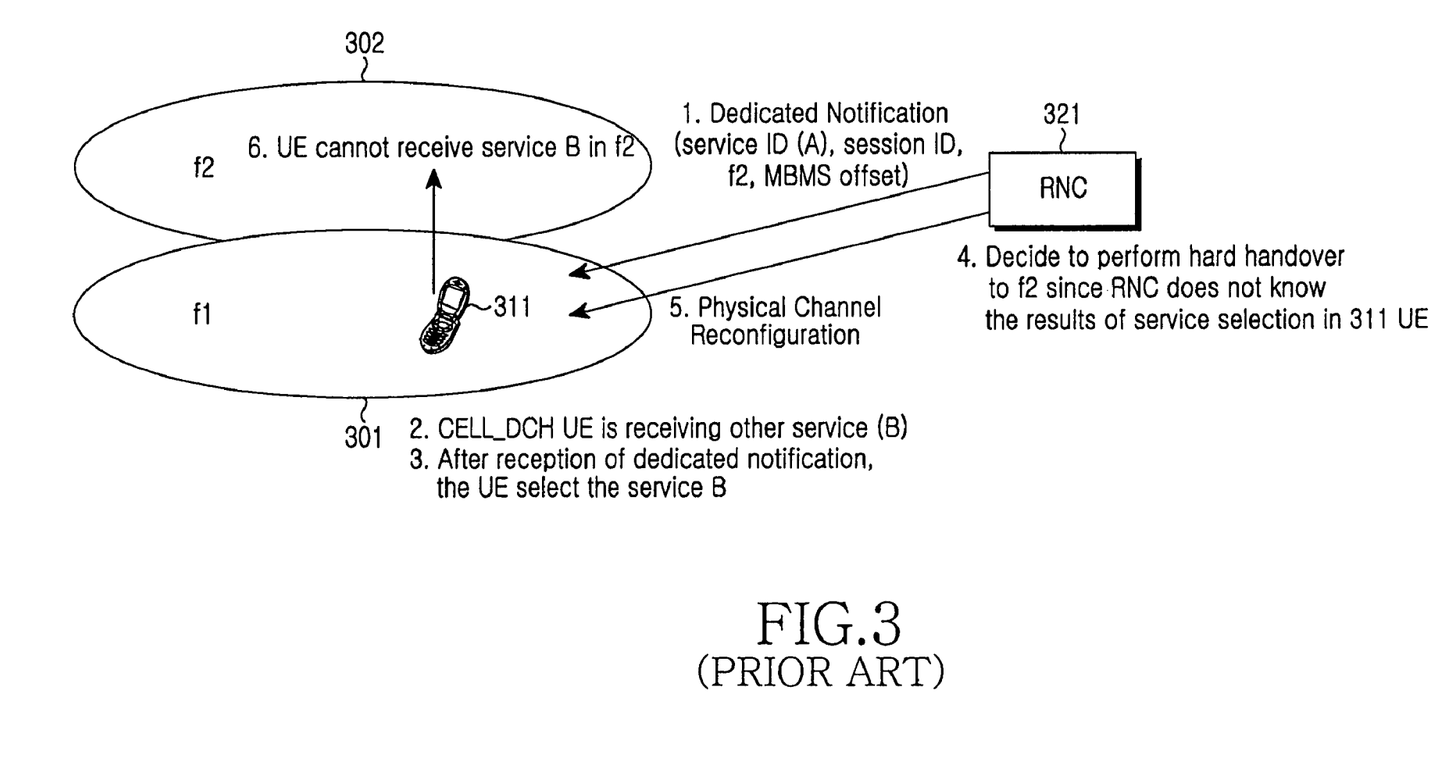
FIG. 3 is a diagram illustrating a conventional procedure by which an MBMS FLC is applied to a CELL_DCH UE.

FIG. 3 is a diagram illustrating a conventional procedure by which a MBMS FLC is applied to a CELL_DCH UE. A reference number 301 represents a cell having the frequency f1, a reference number 302 represents a cell having the frequency f2, a reference number 311 represents the CELL_DCH UE receiving a MBMS service, and a reference number 321 represents a SRNC for controlling the UE 311. Before the MBMS service starts, the UE 311 is located in the cell having the frequency f1.

Referring to FIG. 3, a RNC 321 receives a session start message for the MBMS service (service A), which the UE 311 has joined, from a Serving GPRS Support Node (SGSN), and transmits an ID "A" of the MBMS service, a preferred frequency "f2" of the service A, MBMS offset and session ID information to the UE 311 through a dedicated notification message, in the first step. This allows UEs intended to receive the service A, as opposed to UEs located in cells using frequencies other than the frequency f2, to move to the frequency f2.

When the UE 311 has received the dedicated notification message while receiving a different service (service B) employing the frequency f1 as a preferred frequency band in the second step, the UE 311 simultaneously cannot receive the service B currently being provided and the service A to be provided. This is because the preferred frequency bands of the services A and B are different from each other. Accordingly, the UE 311 selects the service having the highest priority between the services A and B in the third step. This service selection procedure may be performed through mutual information exchange between the UE and a user or applications.

However, the RNC 321 does not know the result of the service selection. Accordingly, even when the UE 311 has selected the service B, the RNC 321 may determine a hard handover to the frequency f2 is necessary in order to allow the UE 311 to receive the service A in a state in which the RNC 321 does not know that the UE 311 has selected the service B, in the fourth step. When the RNC 321 selects the hard handover in the fourth step, the RNC 321 directs the UE 311 to perform the hard handover through a physical channel reconfiguration message in the fifth step. Accordingly, the UE 311 performs the hard handover to the frequency f2 without knowing that the hard handover is a frequency shift for reception of the service A. As a result, the UE 311 does not receive the desired service B.

In the conventional FLC method operating as described above, when the CELL_DCH UE is shifted to a corresponding PL for reception of the MBMS service, an erroneous hard handover may be performed because the SRNC does not know whether the UE has received the service. Further, because the CELL_DCH UE does not indicate that the physical channel reconfiguration message, which is a hard handover indication message received from the SRNC, is for a PL shift of a specific MBMS service or for measurement reports and cell load control, the UE may perform an erroneous hard handover.

SUMMARY OF THE INVENTION

Accordingly, the present invention has been made to solve the above-mentioned problems occurring in the prior art, and it is an object of the present invention to provide a method and an apparatus for performing an efficient hard handover when a Frequency Layer Convergence (FLC) is applied to a CELL_DCH UE receiving a Multimedia Broadcast/Multicast Service (MBMS) service.

It is another object of the present invention to provide a method and an apparatus for allowing a confirmation message for reception of a MBMS service to be received from a UE before hard handover is performed for reception of the MBMS service by the UE after a Serving Radio Network Controller (SRNC) has received a session start message of the specific MBMS service from a Serving GPRS Support Node (SGSN).

It is further another object of the present invention to provide a method and an apparatus for informing a UE of a hard handover for reception of an MBMS service when the hard handover is performed for the reception of the MBMS service by the UE after an SRNC has received a session start message of the specific MBMS service from an SGSN.

It is still another object of the present invention to provide a method and an apparatus for allowing hard handover of a SRNC to be rejected according to a determination of whether a UE receives a MBMS service.

It is yet another object of the present invention to provide a method and an apparatus in which a SRNC refers not only to information for measurement reports and load control of a cell transmitted from a UE, but also to Preferred Frequency Layer (PL) information of a MBMS service, which the UE intends to receive, in order to allow the UE to perform a hard handover.

In order to accomplish the aforementioned object, according to one aspect of the present invention, a method is provided for efficiently performing a frequency shift when a User Equipment (UE) intends to receive at least one service through at least one preferred frequency in a system for providing a Multimedia Broadcast/Multicast Service (MBMS) service. The method comprises the steps of inserting information for a preferred frequency of a service into a message and transmitting the message to the UE, receiving a response message comprising request information representing an indicated service or at least one different service, which has been selected by the UE, and determining if the UE is to perform a hard handover to the preferred frequency based on the request information.

In order to accomplish the aforementioned object, according to another aspect of the present invention, a method is provided for performing hard handover by a User Equipment (UE) using a Frequency Layer Convergence (FLC) in a Multimedia Broadcast/Multicast Service (MBMS) system. The method comprises the steps of receiving a dedicated notification message for reporting that a session for a specific service has started from a Radio Network Controller (RNC), determining if the UE is to receive a service indicated by the dedicated notification message when the dedicated notification message represents a session of the service which the UE has joined, and transmitting a dedicated notification response message comprising an available indication to the RNC.

In order to accomplish the aforementioned object, according to further another aspect of the present invention, a method is provided for efficiently performing a frequency shift when a User Equipment (UE) is interested in receiving at least one service through at least one preferred frequency in a system for providing a Multimedia Broadcast/Multicast Service (MBMS) service. The method comprises the steps of inserting information for a preferred frequency of a service into a dedicated notification message and transmitting the dedicated notification message to the UE, transmitting a physical channel reconfiguration message to the UE comprising indication information for performing a hard handover to the preferred frequency, and receiving a physical channel reconfiguration response message from the UE comprising information regarding whether the UE is to perform the hard handover to the preferred frequency.

An aspect of the present invention also provides that the service is indicated by the dedicated notification message and the dedicated notification message reports a start of the service which the UE has joined.

In order to accomplish the aforementioned object, according to still another aspect of the present invention, a method is provided for performing hard handover by a User Equipment (UE) using a Frequency Layer Convergence (FLC) in a Multimedia Broadcast/Multicast Service (MBMS) system. The method comprises the steps of receiving information indicating that a session for a specific service has started from a Radio Network Controller (RNC) and receiving a physical channel reconfiguration message comprising information representing a shift to a preferred frequency for the service, determining if the UE is to receive a service indicated by the physical channel reconfiguration message when the physical channel reconfiguration message represents a session of a service which the UE has joined, and transmitting a physical channel reconfiguration response message comprising predetermined information to the RNC according to a result of the determination, the predetermined information having an "applicable service" or a "not applicable service" representing whether the UE is to perform the hard handover to the preferred frequency.

In order to accomplish the aforementioned object, according to yet another aspect of the present invention, an apparatus is provided for performing hard handover by a User Equipment (UE) using a Frequency Layer Convergence (FLC) in a Multimedia Broadcast/Multicast Service (MBMS) system. The apparatus comprises a Radio Network Controller (RNC) for inserting information for a preferred frequency of a service into a dedicated notification message and transmitting the dedicated notification message to the UE, the UE for receiving the dedicated notification message from the RNC and transmitting a dedicated notification response message comprising request information to the RNC in response to the dedicated notification message, the request information representing the service indicated by the dedicated notification message or at least one different service, which has been selected by a preset priority, and wherein the RNC determines if the UE is to perform the hard handover to the preferred frequency according to the request information.

An aspect of the present invention also provides that the service is indicated by the dedicated notification message and the dedicated notification message reports a start of the service which the UE has joined.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments according to the present invention will be described with reference to the accompanying drawings. In the following description of the present invention, a detailed description of known functions and configuration incorporated herein will be omitted for conciseness. Terms described in the following description are defined by taking functions thereof into consideration, so they may vary according to the intention of a user and an operator or depending on custom.

Figure 4:
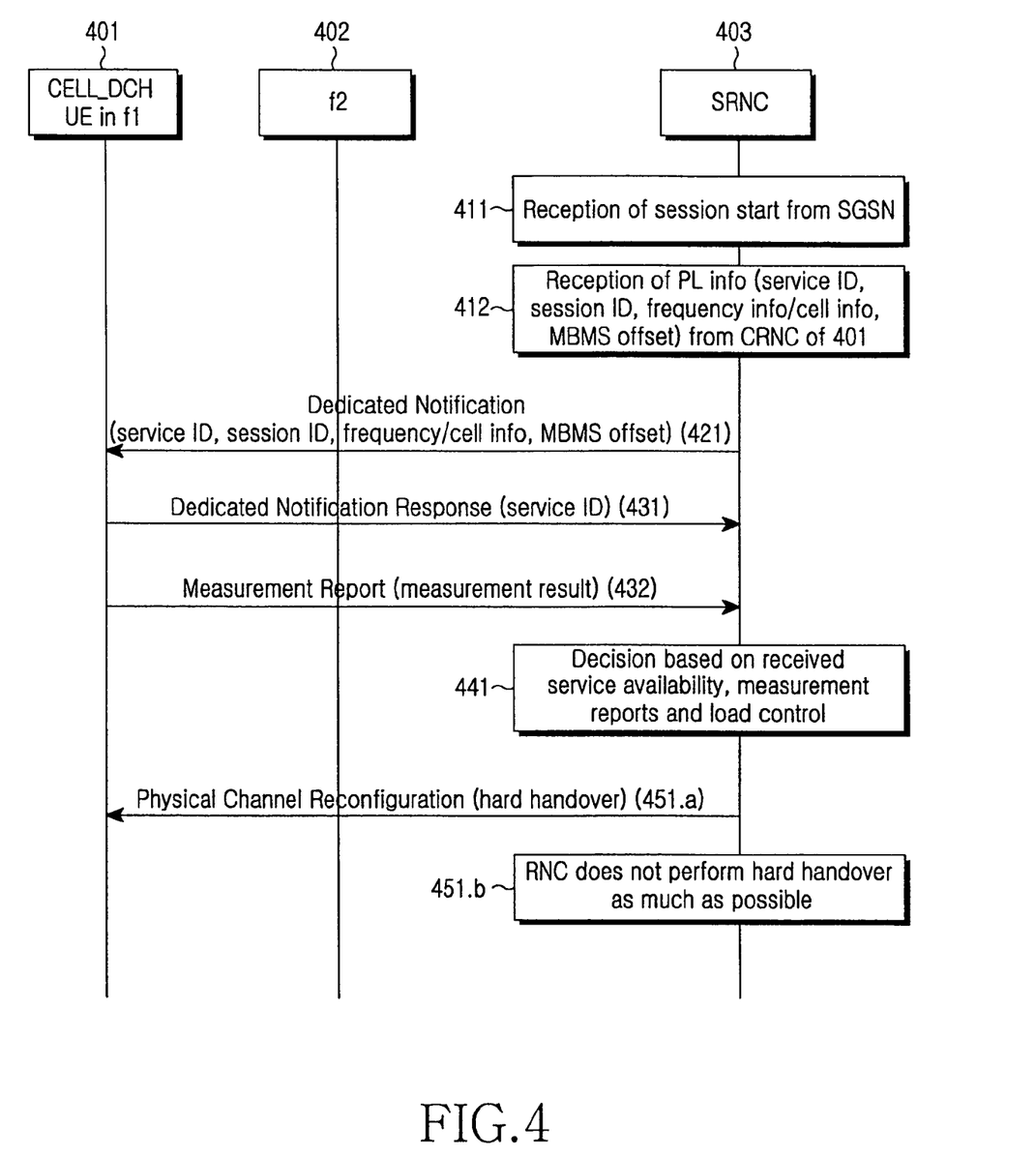
FIG. 4 is a flow diagram illustrating a hard handover process based on a FLC application to a CELL_DCH UE according to an embodiment of the present invention.

FIG. 4 is a flow diagram illustrating a hard handover process based on a Frequency Layer Convergence (FLC) application to a CELL_DCH UE according to an embodiment of the present invention. A reference number 401 represents a CELL_DCH UE located in a cell of a frequency f1, a reference number 402 represents a cell of a frequency f2 that overlaps with frequency f1 in the same service or coverage area, and a reference number 403 represents a Serving Radio Network Controller (SRNC) that controls the UE 401.

In step 411, the SRNC 403 receives a session start message for a Multimedia Broadcast/Multicast Service (MBMS) service, which the UE 401 has joined, from a Serving GPRS Support Node (SGSN). The session start message represents the start of a session of the MBMS service and comprises a service ID, a session ID, Quality of Service (QoS) information, and so on. In step 412, a Control RNC (CRNC) of the UE 401 determines a Preferred Frequency Layer (PL) of the MBMS service by a Radio Resource Management (RRM) and the SRNC 403 receives information for the PL from the CRNC. The CRNC may be identical to the SRNC 403 or may be another RNC. The information for the PL comprises a service ID, a session ID, preferred frequency/cell information, MBMS offset information, and so on.

When the PL of the MBMS service is determined to be the cell 402 having the frequency f2, the SRNC 403 informs the UE 401 that the session of the MBMS service will start and the PL of the MBMS service has been determined as the cell 402 of the frequency f2 through a dedicated notification message in step 421. The dedicated notification message may report that the session of the MBMS service has started and may comprise frequency/cell information, MBMS offset information, and so on, for performance of an FLC if information for the FLC is necessary. The dedicated notification message for informing the CELL_DCH UE that joined the MBMS service that the session of the MBMS service has started comprises a service ID, a session ID, frequency/cell information, MBMS offset information, and so on, for the MBMS service.

For example, the frequency/cell information represents an inter-frequency measurement indication, a cell ID, and so on, and a measurement report represents a Common Pilot Channel (CPICH), a chip energy per white noise (Ec/No), Received Signal Code Power (RSCP), and so on.

The UE 401 receives the dedicated notification message and transfers confirmation information indicating whether to receive the service indicated by the dedicated notification message to the SRNC 403 through a dedicated notification response message in step 431. The dedicated notification response message comprises request information transferred in response to the dedicated notification message, and comprises information regarding whether the indicated service has been selected and information representing at least one different service. In step 432, the UE 401 reports measurement results for the cell having the frequency f2 to the SRNC 403 by means of a measurement report message. The measurement report message uses a measurement report message of a CELL_DCH UE defined in a 3GPP standard which is hereby incorporated by reference. In FIG. 4, the measurement report message is reported to the SRNC 403 in step 432 after the transfer of the dedicated notification response message in step 431. However, the measurement results may be inserted into the dedicated notification response message for transmission. That is, it is possible to insert the measurement results for the cell of the frequency f2 into the dedicated notification response message comprising the confirmation information regarding whether the UE 401 receives the indicated service, and then transfer the dedicated notification response message to the SRNC 403. In another embodiment, when the SRNC 403 determines cell environments of the UE 401 by means of the most recent measurement reports received from the UE 401, step 432 may be omitted.

Table 1 below shows an exemplary format of the dedicated notification response message.

TABLE 1

| Information Element/Group name | Need | Multi | Semantics description |
| --- | --- | --- | --- |
| Message Type | MP | | |
| Service id | MP | Multi | Received service id (TMGI) from Dedicated Notification |
| >Available indication | MP | | Boolean |
| >Cause value | CV-false in Available indication | | Enum {invalid service id, duplicate session, not selected} |
| Other available service lists | OP | Multi | Other available/selected service lists (TMGIs) |

In table 1, the "Service ID" represents a Temporary Mobile Group Identity (TMGI) value of the service indicated through the dedicated notification message, and the available indication represents a confirmation value regarding whether the UE receives the service. If the "Available indication" is true, it indicates that the UE receives the service. However, if the "Available indication" is false, it indicates that the UE does not receive the service. The "Cause value" is a value included in the dedicated notification response message only when the available indication is false, which is set to have a value indicating that the UE has determined not to receive the service.

The "Cause value" comprises a value such as an "invalid service ID", a "duplicate session", a "not selected", and so on. The "invalid service ID" is used when the service indicated through the dedicated notification message is not a service which the UE has joined. The "duplicate session" is used when the session ID of the dedicated notification message is a session previously received in the UE even though the service indicated through the dedicated notification message is the service which the UE has joined. The "not selected" is used when the UE is receiving other services and the service indicated through the dedicated notification message has not been selected through a service selection procedure even though the service indicated through the dedicated notification message is the service which the UE has joined and the session ID is not the session previously received in the UE. The "Other available service list" shows IDs of other services selected excluding a service corresponding to the service ID of the dedicated notification message of table 1 through the service selection procedure of the UE. That is, the "Other available service list" comprises service IDs representing services selected according to the highest priority that was preset in the UE. In step 441, the SRNC 403 determines if hard handover of the UE 401 must be performed with reference to the confirmation information regarding whether the UE 401 receives the service, the measurement reports and cell load information according to the dedicated notification response message. If the confirmation information received from the UE 401 is true, for example, if it is confirmed that the UE 401 has selected the service indicated through the dedicated notification message, the SRNC 403 determines the mobility of the UE 401 such that the UE 401 is hard-handed over to the cell having the frequency f2, which is the PL of the indicated MBMS service, as much as possible. When the hard handover of the UE 401 has been determined in step 441, the SRNC 403 transmits a physical channel reconfiguration message for indicating the hard handover to the UE 401 in step 451.a.

However, if the confirmation information received from the UE 401 is false, i.e., if it is confirmed that the UE 401 has not selected the indicated service and the "Other available service list" comprises the IDs of other services selected through the preset priority, the SRNC 403 determines the mobility of the UE 401 such that the UE 401 stays in the current cell as much as possible without performing the hard handover in step 451.b.

As described in FIG. 4, the dedicated notification response message may also always be transmitted while clearly comprising the confirmation information regarding whether the UE 401 receives the service. However, in another embodiment, the dedicated notification response message may be transmitted only when the UE 401 either receives or does not receive the indicated service. In this case, the SRNC 403 determines that the UE 401 receives the indicated service when the dedicated notification response message has or has not been received.

Figure 5:
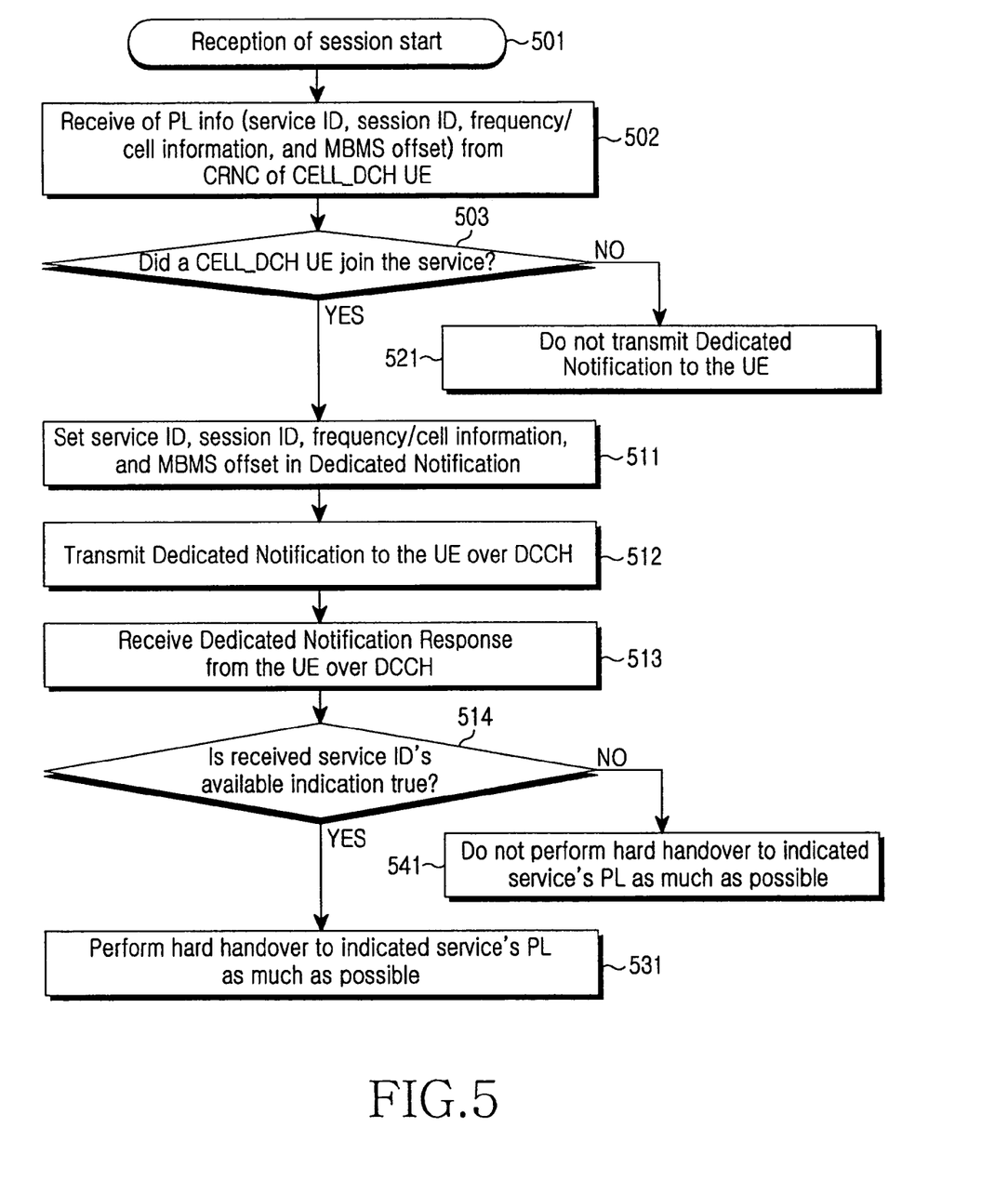
FIG. 5 is a flow diagram illustrating the operation of a Serving Radio Network Controller (SRNC) according to an embodiment of the present invention.

FIG. 5 is a flow diagram illustrating the operation of the SRNC according to an embodiment of the present invention.

In step 501, the SRNC receives a session start indication for a specific MBMS service from the SGSN. In step 502, the SRNC receives PL information for the session of the service from the CRNC. The PL information comprises a service ID, frequency/cell information of the PL, and MBMS offset information. In step 503, the SRNC selects a CELL_DCH UE having joined a service corresponding to the session start. Step 503 is performed with reference to a service ID stored in the SRNC when the UE joins the service and Radio Resource Control (RRC) state information of the UE. If the CELL_DCH UE that joined the service does not exist in step 503, the SRNC does not transmit the dedicated notification message for the MBMS service in step 521.

However, if the CELL_DCH UE that joined the service exists, the SRNC sets not only the service ID and the session ID but also the frequency/cell information, the MBMS offset information, and so on, of the PL information in the dedicated notification message to be transmitted to the UE, in step 511. In step 512, the SRNC transmits the dedicated notification message to the CELL_DCH UE that joined the MBMS service over a Dedicated Channel (DCCH). In step 513, the SRNC receives a response message from the UE for the dedicated notification message, such as a dedicated notification response message.

In step 514, the SRNC determines if the "Available indication" for the service ID of the dedicated notification response message is true or false. If the "Available indication" is false or the "Other available service list" comprises the IDs of other services selected by the UE according to the priority, the SRNC determines that the UE will stay in the current cell as much as possible without performing the hard handover for the MBMS service in step 541. However, if the "Available indication" is true, the SRNC determines that the UE will performs the hard handover to the PL of the service as much as possible in step 531. This allows the UE to receive the service by moving the UE to the PL of the service.

Figure 6:
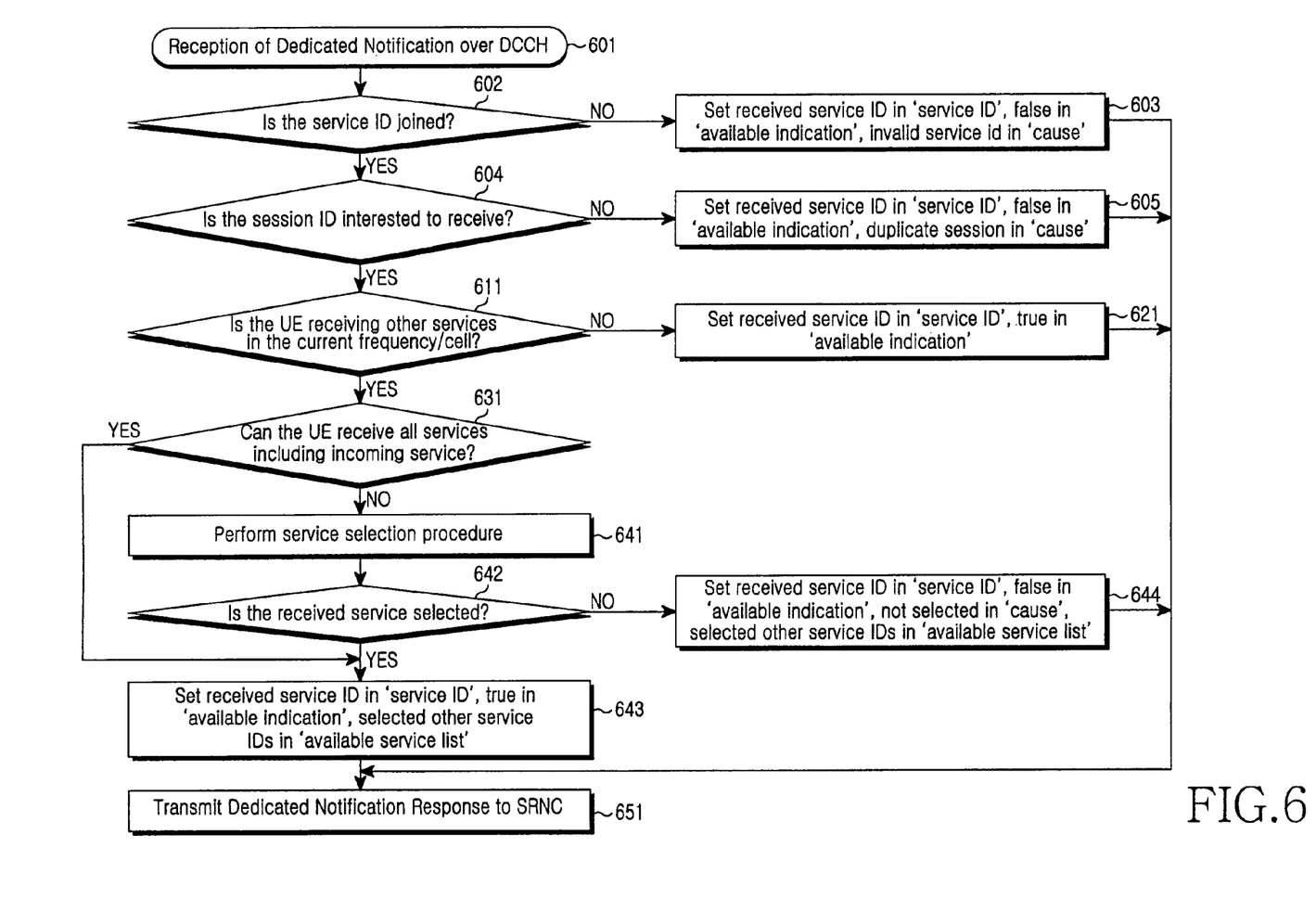
FIG. 6 is a flow diagram illustrating the operation of a UE according to an embodiment of the present invention.

FIG. 6 is a flow diagram illustrating the operation of the UE according to an embodiment of the present invention.

In step 601, the UE receives the dedicated notification message from the SGSN over the DCCH. In step 602, the UE determines if the service ID of the dedicated notification message corresponds to the MBMS service which the UE has joined. If the service ID does not correspond to the MBMS service which the UE has joined, the UE sets a service ID to be included in a dedicated notification response message as the service ID of the dedicated notification message, sets the "Available indication" of the dedicated notification response message to be false, and sets the "Cause value" as an "invalid service ID", in step 603. Then, in step 651, the UE transmits the dedicated notification response message to the SRNC over the DCCH. This is for informing the SRNC that the hard handover is unnecessary because the service ID received through the dedicated notification message does not correspond to the MBMS service which the UE has joined.

However, if the service ID of the dedicated notification message corresponds to the MBMS service which the UE has joined, the UE determines if the session ID of the dedicated notification message corresponds to a session which the UE intends to receive in step 604. If the session ID of the dedicated notification message corresponds to the session that was previously and successfully received in the UE, the UE sets the service ID to be included in the dedicated notification response message as the service ID of the dedicated notification message, sets the "Available indication" to be false, and sets the "Cause value" as a "duplicate session", in step 605. Then, in step 651, the UE transmits the dedicated notification response message to the SRNC over the DCCH. This is for informing the SRNC that the UE will not receive the session because the session has been previously received, or due to another reason, even though the service ID received through the dedicated notification message corresponds to the MBMS service which the UE has joined.

If it is determined that the UE is to receive the session in step 604, the UE determines if the UE is receiving a service, which is different from the service indicated through the dedicated notification message, in the current frequency/cell in step 611. If the UE is not receiving the different service in the current frequency/cell, the UE sets the service ID to be included in the dedicated notification response message as the service ID of the dedicated notification message, and sets the "Available indication" to be true, in step 621. Then, in step 651, the UE transmits the dedicated notification response message to the SRNC over the DCCH. This is for requesting the SRNC to perform hard handover to the PL of the service if it is required because the UE will receive the session received through the dedicated notification message.

However, if the UE is receiving the different service in step 611, the UE determines if the UE can receive all of the different services and the service of the dedicated notification message in step 631. This relates to the capability of the UE. For example, if the UE has a multi-reception antenna, the UE can receive the indicated service in another frequency/cell while receiving the different service in the current frequency/cell. The capability of the UE comprises the existence or absence of the multi-reception antenna, the number of simultaneously receptible channels, and so on. The UE determines if the UE can receive all of the services with reference to its own capability information.

If the UE can receive all of the services in step 631, the UE sets the service ID to be included in the dedicated notification response message as the service ID of the dedicated notification message, sets the "Available indication" to be true, and sets service IDs of other services excluding the indicated service in the "available service list", in step 641. Then, in step 651, the UE transmits the dedicated notification response message to the SRNC over the DCCH. This is for requesting the SRNC to perform the hard handover to the PL of the service if it is required and providing the SRNC with list information for other services which the UE has determined to receive because the UE will receive the indicated service.

If the UE cannot receive all of the services in step 631, the UE performs a service selection procedure in step 641. The service selection procedure is performed through information exchange with a user using the UE or applications, and is selected according to the user's intention or the priorities of services allocated by the applications. Generally, a service of the highest priority is selected. If the UE can receive some other services together with the service of the highest priority, said other services may also be selected.

In step 642, the UE determines if the indicated service has been selected through the service selection procedure. If the indicated service has not been selected, the UE sets the service ID to be included in the dedicated notification response message as the service ID of the dedicated notification message, sets the "Available indication" to be false, sets the "Cause value" as "not selected", and sets the service IDs of the selected services in the "available service list", in step 644. Then, in step 651, the UE transmits the dedicated notification response message to the SRNC over the DCCH. This is for informing the SRNC of other services which the UE has determined to receive because the service indicated through the dedicated notification message has not been selected due to the services having been received and thus the UE does not receive the indicated service.

However, if the indicated service has been selected in step 642, the UE sets the service ID to be included in the dedicated notification response message as the ID of the indicated service, sets the "Available indication" to be true, and sets the service IDs of the services selected in step 641 in the "Other available service list", in step 643. Then, in step 651, the UE transmits the dedicated notification response message to the SRNC over the DCCH. This is for requesting the SRNC to perform the hard handover if it is required because the indicated service has been selected together with the services having been received, and providing the SRNC with list information for other services which the UE has determined to receive.

Figure 7:
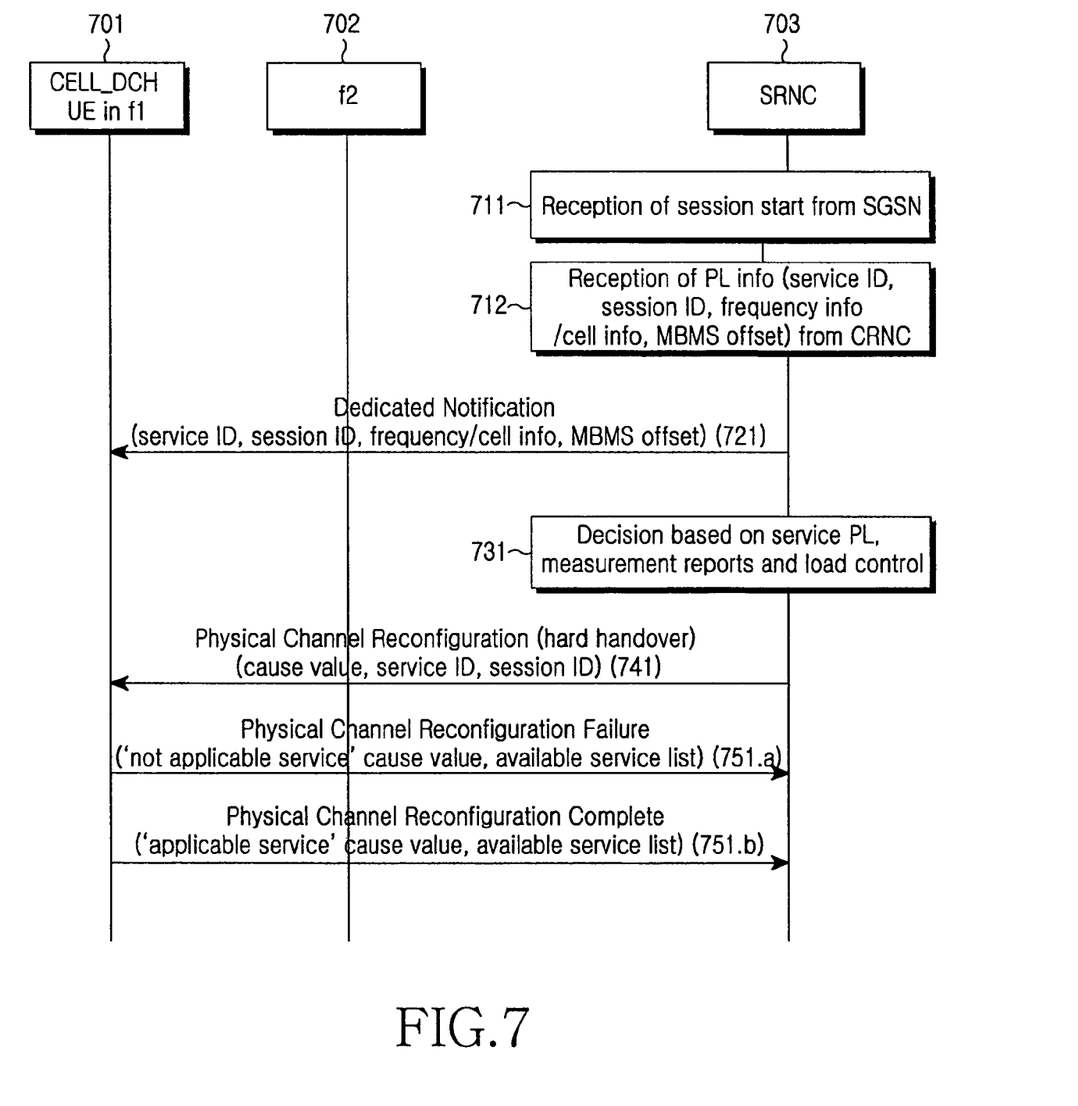
FIG. 7 is a flow diagram illustrating a hard handover process based on an MBMS FLC application to a CELL_DCH UE according to an embodiment of the present invention.

FIG. 7 is a flow diagram illustrating a hard handover process based on an MBMS FLC application to a CELL_DCH UE according to an embodiment of the present invention. A reference number 701 represents a CELL_DCH UE located in a cell having a frequency f1, a reference number 702 represents a cell having a frequency f2 overlapping the frequency f1 in the same service or coverage area, and a reference number 703 represents a SRNC of the UE 701.

In step 711, the SRNC 703 receives a session start message for a specific MBMS service, which the UE 701 has joined, from a SGSN. The session start message represents the start of a session of the MBMS service and comprises a service ID, a session ID, QoS information, and so on. In step 712, when a CRNC of the UE 701 determines a PL of the MBMS service by the RRM, the SRNC 703 receives information for the PL from the CRNC. The CRNC may be identical to the SRNC 703 or may be another RNC. The information for the PL comprises a service ID, a session ID, preferred frequency/cell information, MBMS offset information, and so on.

When the PL of the MBMS service has been determined as the cell 702 having the frequency f2, the SRNC 703 informs the UE 701 that the session of the MBMS service will start and the PL of the MBMS service has been determined through a dedicated notification message in step 721. The dedicated notification message comprises the service ID, the session ID, frequency/cell information of the reference number 702, MBMS offset information. In the first embodiment of FIG. 4, the dedicated notification message is used. However, in the second embodiment of FIG. 7, the dedicated notification message may be omitted because the physical channel reconfiguration message in step 741 can substitute for the dedicated notification message.

In step 731, the SRNC 703 determines that the UE 701 will perform the hard handover to the cell 702 having the frequency f2, which is the PL of the indicated service, as much as possible, with reference to PL information of the indicated service, measurement reports and cell load information. If it is determined that the UE 701 will perform the hard handover to the cell of the frequency f2 in step 731, the SRNC 703 transmits the physical channel reconfiguration message to the UE 701, thereby directing the UE 701 to perform the hard handover. The physical channel reconfiguration message comprises information of a "Cause value", a service ID, a session identifier, and so on. The "Cause value" is set as a value representing a "Move to MBMS PL", the service ID and the session identifier are respectively set as a service ID value and a session ID value of the indicated service. That is, in this embodiment, the "Cause value" representing the "Move to MBMS PL", the service ID and the session ID are set in the physical channel reconfiguration message for indicating the hard handover, thereby informing the UE 701 that the hard handover occurs in order to move the UE 701 to the PL for reception of the MBSM service, the session of which is to start.

When the physical channel reconfiguration message is received from the SRNC 703, the UE 701 transmits a physical channel reconfiguration failure or completion message to the SRNC 703 in response to the physical channel reconfiguration message in step 751.*a* or 751.*b*.

The physical channel reconfiguration failure message in step 751.*a* is transmitted when the UE 701 has been receiving other services in the reception of the physical channel reconfiguration message and has not selected the indicated service as a result of analysis for the service ID, the session ID and the "Move to MBMS PL" information included in the physical channel reconfiguration message. Further, the physical channel reconfiguration failure message may also be transmitted when the UE 701 has successfully performed the session of the service and thus need not receive the session again. That is, the UE 701 transmits the physical channel reconfiguration failure message when it is not necessary to perform the hard handover for the reception of the indicated service. This is for reporting that the indicated service has not been selected by the UE 701.

The physical channel reconfiguration failure message comprises the "Cause value" representing a "not applicable service", and the "available service list" having service IDs of other services, which the UE 701 has determined to receive, except for the indicated service. That is, the UE 701 provides the SRNC 703 with both a hard handover rejection due to the lack of necessity for the reception of the indicated service, and list information for said other services which the UE 701 has determined to receive, through the physical channel reconfiguration failure message.

The physical channel reconfiguration completion message in step 751.*b* is transmitted when the UE 701 has determined that the UE 701 will receive the indicated service. For example, the UE 701 transmits the physical channel reconfiguration completion message when the UE 701 determines to receive the indicated service directly after reading the indicated service and the session ID, the UE 701 has been receiving other services in the reception of the physical channel reconfiguration message, or the service indicated through the physical channel reconfiguration message has been selected through a service selection procedure. This is for reporting the acceptance of the hard handover because the indicated service has been selected by the UE 701.

The physical channel reconfiguration completion message comprises the "Cause value" representing an "applicable service", and the "available service list" having the service IDs of said other services, which the UE 701 has determined to receive, except for the service indicated through the physical channel reconfiguration message. That is, the UE 701 provides the SRNC 703 with both a hard handover performance due to the necessity of the reception of the indicated service, and the list information for said other services which the UE 701 has determined to receive, through the physical channel reconfiguration completion message.

Figure 8:
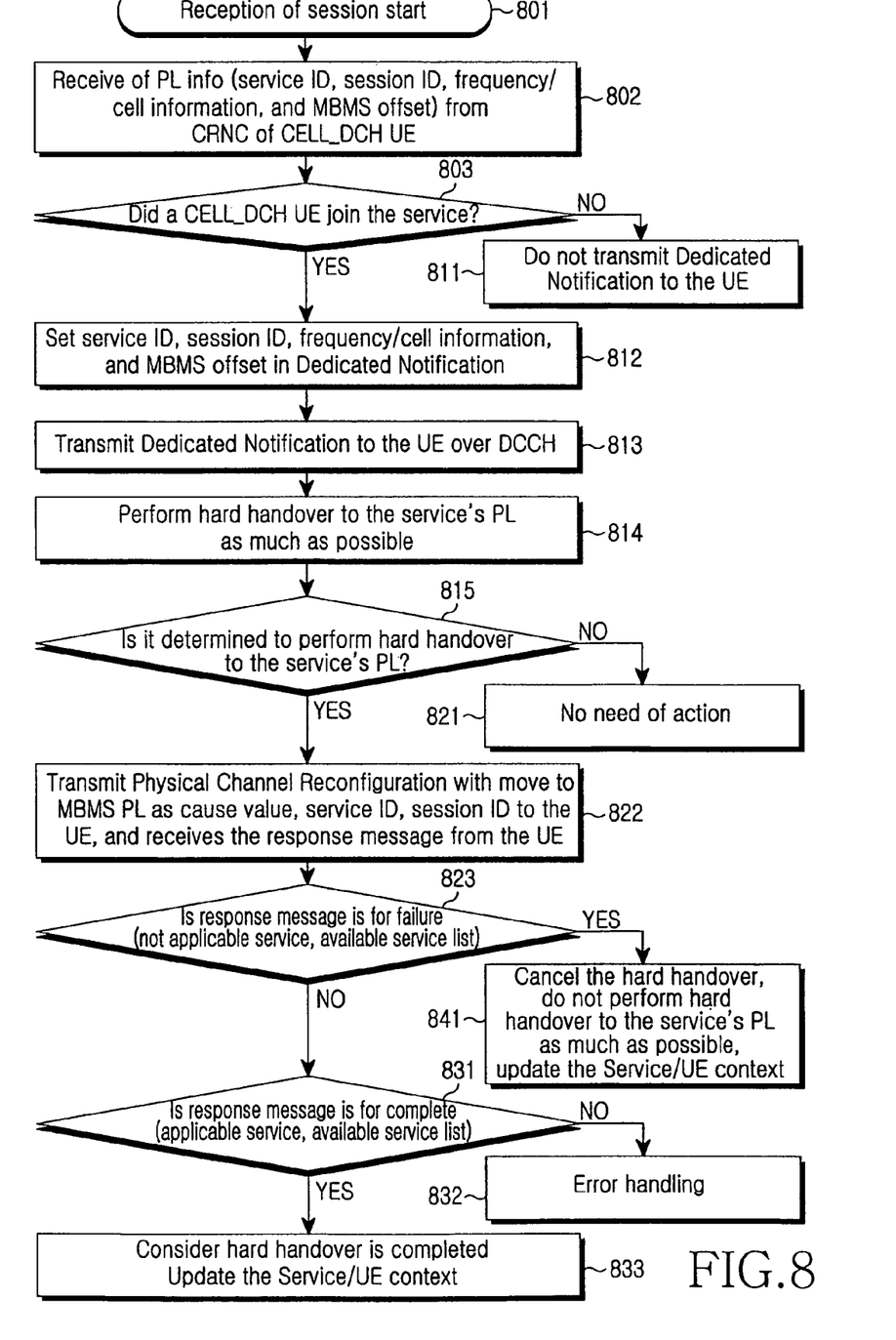
FIG. 8 is a flow diagram illustrating the operation of an SRNC according to an embodiment of the present invention.

FIG. 8 is a flow diagram illustrating the operation of the SRNC according to an embodiment of the present invention.

In step 801, the SRNC receives a session start for a specific MBMS service from the SGSN. In step 802, the SRNC receives PL information for the session of the service from the CRNC. The PL information comprises a service ID, frequency/cell information of the PL, and MBMS offset information. In step 803, the SRNC selects a CELL_DCH UE that joined a service corresponding to the session start. Step 803 is performed with reference to a service ID stored in the SRNC when the UE joins the service and RRC state information of the UE. If the CELL_DCH UE that joined the service does not exist, the SRNC does not transmit the dedicated notification message in step 811. However, if the CELL_DCH UE that joined the service exists, the SRNC sets not only the service ID and the session ID for MBMS service but also the frequency/cell information, the MBMS offset information, and so on, which are the PL information of the service session, in the dedicated notification message to be transmitted to the UE, in step 812. In step 813, the SRNC transmits the dedicated notification message to the UE over a DCCH.

In step 814, the SRNC determines that the UE will perform the hard handover to the PL of the service as much as possible. When it is determined to allow the UE to perform the hard handover to the PL of the service with reference to measurement reports of the UE, cell load information and the PL information of the service in step 815, the SRNC transmits the physical channel reconfiguration message to the UE in step 822. The physical channel reconfiguration message comprises the "Cause value" of the "Move to MBMS PL" reporting the occurrence of the hard handover due to the "Move to MBMS PL", and also comprises the service ID and the session ID.

After transmitting the physical channel reconfiguration message to the UE, the SRNC receives a response message from the UE in step 823. If the response message received in step 823 is the physical channel reconfiguration failure message comprising the "Cause value" representing the "not applicable service" and the "available service list", the SRNC cancels the hard handover of the UE and determines the mobility of the UE such that the UE stays in the current cell as much as possible in step 841. Herein, the SRNC can update the service context or the UE context by the "available service list".

However, if the response message received in step 831 is the physical channel reconfiguration completion message comprising the "Cause value" representing the "applicable service" and the "available service list", the SRNC regards that the UE has completed the hard handover to the PL of the service, in step 833. Likewise, the SRNC can update the service context or the UE context by the "available service list".

Figure 9:
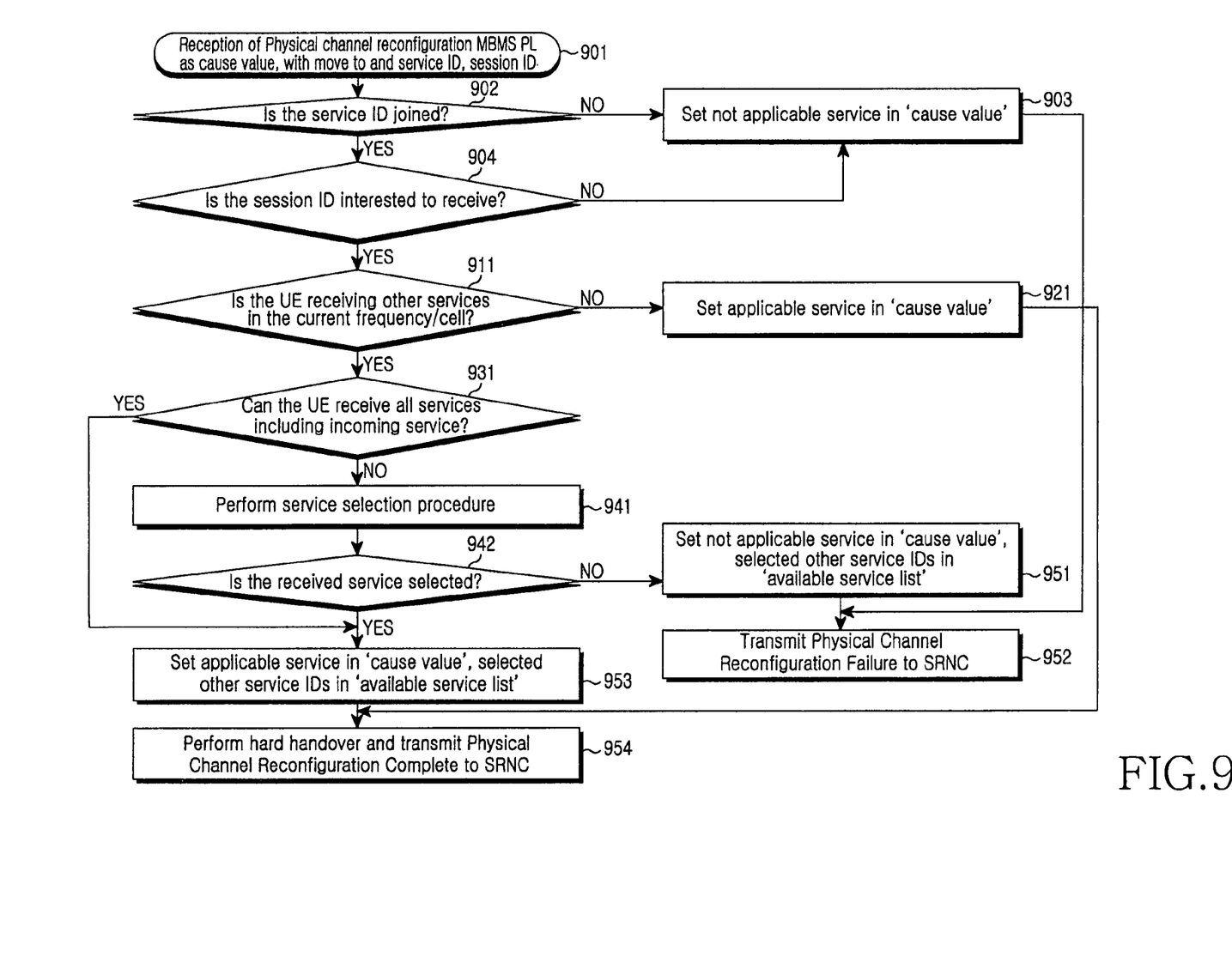
FIG. 9 is a flow diagram illustrating the operation of a UE according to an embodiment of the present invention.

FIG. 9 is a flow diagram illustrating the operation of the UE according to an embodiment of the present invention.

In step 901, the UE receives the physical channel reconfiguration message comprising the "Cause value" of the "Move to MBMS PL", the service ID, and the session ID. In step 902, the UE determines if the service ID of the physical channel reconfiguration message corresponds to the MBMS service which the UE has joined. If the service ID does not correspond to the MBMS service which the UE has joined, the UE sets the "Cause value" to be included in the physical channel reconfiguration failure message to be the "not applicable service" in step 903, and transmits the physical channel reconfiguration failure message to the SRNC in step 952.

However, if the service ID of the physical channel reconfiguration message corresponds to the MBMS service which the UE has joined, the UE determines if the session ID of the physical channel reconfiguration message corresponds to a session which the UE intends to receive in step 904. If the session ID of the physical channel reconfiguration message corresponds to the session that was previously and successfully received in the UE, the UE sets the "Cause value" to be included in the physical channel reconfiguration failure message to be the "not applicable service" in step 903 because it is not necessary to receive the repeatedly transmitted session, and transmits the physical channel reconfiguration failure message to the SRNC in step 952. If it is determined that the UE is to receive a session having the session ID of the physical channel reconfiguration message in step 904, the UE determines if the UE has received other services in the reception of the physical channel reconfiguration message in the current frequency/cell in step 911. If the UE has not received said other services in the current frequency/cell, the UE sets the "Cause value" to be included in the physical channel reconfiguration completion message to be the "applicable service" in step 921. In step 954 the UE performs the hard handover to the PL indicated by the physical channel reconfiguration message and transmits the physical channel reconfiguration completion message to the SRNC.

However, if the UE has received said other services, the UE determines if the UE can receive all of said other services and the service indicated through the physical channel reconfiguration message in step 931. This relates to the capability of the UE. For example, if the UE has a multi-reception antenna, the UE can receive the indicated service in another frequency/cell while receiving the different service in the current frequency/cell. If the UE can receive all of the services, the UE sets the "Cause value" to be included in the physical channel reconfiguration completion message to be the "applicable service" and sets service IDs of said other services excluding the indicated service in the "available service list", in step 953. Then, in step 954, the UE performs the hard handover to the PL of the indicated MBMS service and transmits the physical channel reconfiguration completion message to the SRNC.

However, if the UE cannot receive all of the services, the UE performs a service selection procedure in step 941. The service selection procedure may be performed through information exchange with a user using the UE or applications, and follows the user's intention or the priorities of services allocated by the applications. Generally, a service of the highest priority is selected. If the UE can receive some other services together with the service of the highest priority, said other services may also be selected.

In step 942, the UE determines if the indicated service has been selected through the service selection procedure. If the indicated service has not been selected, the UE sets the "Cause value" to be included in the physical channel reconfiguration failure message to be the "not applicable service" and sets the service IDs of said selected other services in the "available service list", in step 951. Then, in step 952, the UE transmits the physical channel reconfiguration failure message to the SRNC. However, if the indicated service has been selected, the UE sets the "Cause value" to be included in the physical channel reconfiguration completion message to be the "applicable service" and sets the service IDs of said selected other services in the "available service list", in step 953. Then, in step 954, the UE performs the hard handover to the PL of the indicated MBMS service and transmits the physical channel reconfiguration completion message to the SRNC.

According to the embodiments of the present invention as described above, in decision of hard handover of a CELL_DCH UE for reception of an MBMS service, an SRNC receives information regarding whether the UE receives the MBMS service, so that it is possible for the UE to identity a physical channel reconfiguration message, which is a hard handover indication message received from the SRNC, is for a PL shift of a specific MBMS service or for existing measurement reports and cell load control. Consequently, a hard handover may be performed.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for performing a frequency selection when a User Equipment (UE) intends to receive at least one service through at least one preferred frequency in a system for providing a Multimedia Broadcast/Multicast Service (MBMS) service, the method comprising the steps of:

inserting, by a Radio Network Controller (RNC), information regarding a preferred frequency of a service into a dedicated message indicating a start of the service which the UE has joined, and transmitting the dedicated message to the UE;

receiving, by the RNC from the UE, a response message in response to the transmitted dedicated message, the response message including information regarding whether the UE selects the service for reception or not, or at least one different service that the UE selects for reception; and determining, by the RNC, if the UE is to perform a hard handover to the preferred frequency of the service according to the information included in the response message.

2. The method as claimed in claim 1, wherein the UE selects at least one of the service and the at least one different service for reception according to a priority that was preset in the UE.

3. The method as claimed in claim 1, wherein the step of determining, by RNC, if the UE is to perform the hard handover comprises the sub-steps of:

determining that the UE is to perform the hard handover to the preferred frequency of the service when the information included in the response message represents the service; and determining that the UE stays in a current cell when the information included in the response message represents said at least one different service selected by the UE.

4. The method as claimed in claim 1, wherein the information regarding the preferred frequency of the service comprises a service ID representing the service, a session ID representing a session, and frequency/cell information and service offset information representing the preferred frequency of the service.

5. The method as claimed in claim 1, wherein the information included in the response message comprises a first entry indicating whether the service has been selected for reception, and a second entry listing said at least one different service.

6. The method as claimed in claim 1, wherein the service has been joined by the UE and the dedicated message reports a start of the service.

7. A method for performing a hard handover by a User Equipment (UE) using a Frequency Layer Convergence (FLC) in a Multimedia Broadcast/Multicast Service (MBMS) system, the method comprising the steps of: receiving, by the UE from a Radio Network Controller (RNC), a dedicated message indicating a start of a service which the UE has joined and including information regarding a preferred frequency of the service; determining, by the UE, if the UE selects the service for reception, or at least one different service that the UE selects for reception; and transmitting, by the UE to the RNC, a response message in response to the dedicated message, the response message comprising a first entry indicating whether the UE is to receive the service and being used to determine, by the RNC, if the UE is to perform a hard handover to the preferred frequency of the service.

8. The method as claimed in claim 7, wherein the first entry is set to have a value indicating that the UE is to receive the service when the UE has not received at least one different service using a current frequency in a current cell when receiving the dedicated message.

9. The method as claimed in claim 7, wherein the step of determining, by the UE, if the UE is to receive the service comprises:

performing a service selection procedure for selecting at least one service from among the service and at least one different service when the UE has received said at least one different service using a current frequency in a current cell when receiving the dedicated message;

setting the first entry to have a value representing that the UE is to receive the service when the service has been selected as a result of the service selection procedure; and setting the first entry to have a value representing that the UE is not to receive the service when the service has not been selected as the result of the service selection procedure.

10. The method as claimed in claim 7, wherein the response message comprises a service ID representing the service.

11. The method as claimed in claim 10, wherein the response message further comprises a service ID of at least one other service to be received, excluding the service.

12. The method as claimed in claim 9, wherein the service selection procedure allows a service of highest priority to be selected according to a priority that was preset in the UE.

13. The method as claimed in claim 7, further comprising a step of transmitting, by the UE, the response message to the RNC when the dedicated message does not comprise information representing a session of a service which the UE has joined, wherein the first entry is set to have a value indicating that the UE is not to receive the service.

14. A method for efficiently performing a frequency selection for enabling a User Equipment (UE) to receive at least one service through at least one preferred frequency in a system for providing a Multimedia Broadcast/Multicast Service (MBMS) service, the method comprising the steps of:

inserting, by a Radio Network Controller (RNC), information regarding a preferred frequency of a service which the UE has joined into a dedicated notification message and transmitting the dedicated notification message to the UE;

transmitting, by the RNC to the UE, a physical channel reconfiguration message, the physical channel reconfiguration message comprising information indicating that the UE perform a hard handover to the preferred frequency of the service; and receiving, by the RNC from the UE, a physical channel reconfiguration response message in response to the physical channel reconfiguration message, the physical channel reconfiguration response message comprising information indicating whether the UE is to perform the hard handover to the preferred frequency of the service.

15. The method as claimed in claim 14, wherein the information regarding the preferred frequency of the service comprises a service ID representing the service, a session ID representing a session, and frequency/cell information and service offset information representing the preferred frequency of the service.

16. The method as claimed in claim 14, wherein the physical channel reconfiguration message comprises a service ID representing the service, a session ID representing a session, and information representing a shift to the preferred frequency of the service.

17. The method as claimed in claim 14, wherein the physical channel reconfiguration response message comprises a first entry indicating whether the UE is to perform the hard handover, and a second entry listing at least one service selected by the UE according to a priority level.

18. A method for performing a hard handover by a User Equipment (UE) using a Frequency Layer Convergence (FLC) in a Multimedia Broadcast/Multicast Service (MBMS) system, the method comprising the steps of:

receiving, by the UE from a Radio Network Controller (RNC), information indicating a start of a service which the UE has joined, and receiving a physical channel reconfiguration message comprising information regarding a preferred frequency designated for the service and indicating that the UE perform a hard handover to the preferred frequency of the service;

determining, by the UE, if the UE is to receive the service; and transmitting, by the UE to the RNC, a physical channel reconfiguration response message in response to the physical channel reconfiguration message comprising predetermined information according to a result of the determination, the predetermined information having a first entry representing whether the UE is to perform the hard handover to the preferred frequency of the service.

19. The method as claimed in claim 18, wherein the step of determining, by the UE, if the UE is to receive the service comprises:

setting the first entry to have a value representing that the UE is to receive the service when the UE has not received other services using a current frequency in a current cell when receiving the physical channel reconfiguration message.

20. The method as claimed in claim 18, wherein the step of determining, by the UE, if the UE is to receive the indicated service comprises:

performing a service selection procedure for selecting at least one service from among the service and other services when the UE has received said other services using a current frequency in a current cell when receiving the physical channel reconfiguration message;

setting the first entry to have a value indicating that the UE is to receive the service when the service has been selected as a result of the service selection procedure; and setting the first entry to have a value indicating that the UE is not to receive the service when the service has not been selected as the result of the service selection procedure.

21. The method as claimed in claim 18, wherein the physical channel reconfiguration response message further comprises a second entry listing a service ID of at least one different service selected according to a priority, excluding the service.

22. The method as claimed in claim 18, further comprising:

transmitting, by the UE, the physical channel reconfiguration response message comprising the first entry that was set to have a value indicating that the UE is not to receive the service, when the service has been joined by the UE and the physical channel reconfiguration message does not comprise information representing the session of the service.

23. The method as claimed in claim 18, wherein the service has been joined by the UE and the dedicated notification message reports a start of the service.

24. An apparatus for performing a hard handover by a User Equipment (UE) using a Frequency Layer Convergence (FLC) in a Multimedia Broadcast/Multicast Service (MBMS) system, the apparatus comprising:

a Radio Network Controller (RNC) for inserting information regarding a preferred frequency of a service into a dedicated notification message indicating a start of the service which the UE has joined, and transmitting the dedicated notification message to the UE;

the UE for receiving the dedicated notification message from the RNC and transmitting a response message to the RNC in response to the dedicated notification message, wherein the response message comprises information indicating that at least one of the service and at least one different service has been selected for reception based on a preset priority; and wherein the RNC determines if the UE is to perform the hard handover to the preferred frequency according to the information included in the response message.

25. The apparatus as claimed in claim 24, wherein the at least one selected service is selected according to a priority that was preset in the UE.

26. The apparatus as claimed in claim 24, wherein the RNC determines that the UE is to perform the hard handover to the preferred frequency when the information included in the response message represents that the service is selected by the UE for reception, and determines that the UE stays in a current cell when the request information represents that said at least one different service is selected by the UE for reception.

27. The apparatus as claimed in claim 24, wherein the information regarding the preferred frequency of the service comprises a service ID representing the service, a session ID representing a session, and frequency/cell information and service offset information representing the preferred frequency of the service.

28. The apparatus as claimed in claim 24, wherein the information included in the response message comprises a first entry indicating that the service has been selected for reception, and a second entry representing said at least one different service.

29. The apparatus as claimed in claim 28, wherein the UE sets the first entry to have a value indicating that the UE is to receive the service when the UE has not received said at least one different service using a current frequency in a current cell when receiving the dedicated notification message.

30. The apparatus as claimed in claim 28, wherein the UE performs a service selection procedure for selecting at least one service from among the service and said at least one different service when the UE has received said at least one different service using a current frequency in a current cell when receiving the dedicated notification message, sets the first entry to have a value indicating that the UE is to receive the service when the service has been selected as a result of the service selection procedure, and sets the first entry to have a value indicating that the UE is not to receive the service when the service has not been selected as the result of the service selection procedure.

31. The apparatus as claimed in claim 24, wherein when the dedicated notification message does not comprise information representing a session of a service which the UE has joined, the response message comprises a first entry having been set to have a value representing that the UE is not to receive the service.

32. The apparatus as claimed in claim 24, wherein the service has been joined by the UE and the dedicated notification message reports a start of the service.

* * * * *